(12) United States Patent
Voudouris et al.

(10) Patent No.: US 11,547,534 B2
(45) Date of Patent: Jan. 10, 2023

(54) ORTHODONTIC LIP ADVANCER

(71) Applicant: Spartan Orthodontics Inc., Toronto (CA)

(72) Inventors: John C Voudouris, Toronto (CA); John Dean Voudouris, Toronto (CA)

(73) Assignee: Spartan Orthodontics Inc., Toronto (CA)

( * ) Notice: Subject to any disclaimer, the term of this patent is extended or adjusted under 35 U.S.C. 154(b) by 649 days.

(21) Appl. No.: 16/046,002

(22) Filed: Jul. 26, 2018

(65) Prior Publication Data

US 2019/0029776 A1    Jan. 31, 2019

Related U.S. Application Data

(60) Provisional application No. 62/537,285, filed on Jul. 26, 2017.

(51) Int. Cl.
| | | |
|---|---|---|
| *A61C 7/36* | (2006.01) | |
| *A61C 7/08* | (2006.01) | |
| *A61C 7/14* | (2006.01) | |
| *A61C 7/20* | (2006.01) | |
| A61C 7/22 | (2006.01) | |

(52) U.S. Cl.
CPC .............. *A61C 7/36* (2013.01); *A61C 7/08* (2013.01); *A61C 7/14* (2013.01); *A61C 7/20* (2013.01); *A61C 7/22* (2013.01)

(58) Field of Classification Search
CPC .... A61C 7/08; A61C 7/10; A61C 7/14; A61C 7/20; A61C 7/22; A61C 7/36; A61C 5/90; A61B 34/10

USPC .......................................................... 433/19
See application file for complete search history.

(56) References Cited

U.S. PATENT DOCUMENTS

| | | | | |
|---|---|---|---|---|
| 5,092,768 | A | * | 3/1992 | Korn ................... A61C 7/00 433/18 |
| 6,293,790 | B1 | * | 9/2001 | Hilliard ............... A61C 7/04 101/3.1 |
| 10,136,964 | B2 | * | 11/2018 | Borovinskih ........ A61C 7/002 |
| 2002/0192617 | A1 | * | 12/2002 | Phan .................. A61C 19/003 433/6 |

(Continued)

FOREIGN PATENT DOCUMENTS

JP        2014113241 A  *  6/2014

*Primary Examiner* — Edward Moran
*Assistant Examiner* — Matthew P Saunders
(74) *Attorney, Agent, or Firm* — McMillan LLP

(57) ABSTRACT

A lip advancer is presented for preventing proclining or tipping forward of the lower incisors that causes relapse and gingival recession in retention with forward intermaxillary elastic traction that extends diagonally from posterior bracket hooks in the lower arch anchored to hooks on upper anchorage appliances. In one embodiment, the lip advancer is comprised of an invisible clear liner type plastic retainer for use with a dental arch, and a bumper extending labially from the retainer for pressing against the patient's lip causing the lip muscles to react pushing back with an opposite force thus preventing the anterior teeth from flaring labially. In another embodiment, for use with a plurality of brackets and an archwire, the lip advancer comprises an auxiliary archwire extending from and in contact with the brackets, and a bumper formed on the auxiliary archwire for applying pressure labially to a corresponding lip.

14 Claims, 13 Drawing Sheets

(56) References Cited

U.S. PATENT DOCUMENTS

| | | | | |
|---|---|---|---|---|
| 2004/0209218 A1* | 10/2004 | Chishti | .................... | A61C 7/36 |
| | | | | 433/6 |
| 2006/0099546 A1* | 5/2006 | Bergersen | ................ | A61C 7/10 |
| | | | | 433/6 |
| 2006/0188834 A1* | 8/2006 | Hilliard | .................... | A61C 7/08 |
| | | | | 433/24 |
| 2009/0117506 A1* | 5/2009 | Igari | ...................... | A45D 44/22 |
| | | | | 433/6 |
| 2013/0089828 A1* | 4/2013 | Borovinskih | ............ | A61C 7/08 |
| | | | | 433/6 |
| 2014/0080083 A1* | 3/2014 | Mathieu | .................. | A61F 5/566 |
| | | | | 128/848 |
| 2017/0106267 A1* | 4/2017 | Garner | .................. | A61M 16/00 |
| 2018/0036164 A1* | 2/2018 | Bryan | ...................... | A61C 7/08 |
| 2018/0256295 A1* | 9/2018 | Huang | ..................... | A61C 7/10 |
| 2019/0175305 A1* | 6/2019 | Hung | .................... | A61C 7/303 |
| 2019/0201166 A1* | 7/2019 | Hung | ...................... | A61C 7/08 |
| 2019/0388190 A1* | 12/2019 | Hung | ...................... | A61C 7/08 |
| 2020/0188061 A1* | 6/2020 | Carriere Lluch | ........ | A61C 7/36 |

\* cited by examiner

ORTHODONTIC LIP ADVANCER

FIELD OF THE INVENTION

The present invention relates to the field of orthodontic appliances, made of invisible liner plastic, or metal, and more particularly to an orthodontic lip advancer.

BACKGROUND OF THE INVENTION

A malocclusion is a misalignment or incorrect relation between the two jaws, maxilla and mandible, and the teeth of the respective two dental arches. This is often referred to as a skeletal dysplasia characterized by overjet of the upper incisors and jaw protraction, and often requires external headgear wear. There are generally three orthodontic terms to describe direction. Buccal-lingually means from the cheek side to the tongue side, respectively. Mesial-distally means from anterior to posterior or front to back. Occlusal-gingivally means from the bite side to the gum side. Malocclusion or malalignment of the bite, may be classified in one of three classes:

Class I: Neutrocclusion where the molar relationship of the occlusion is within normal limits. This is described as the maxillary (or upper) first molar mesial cusp fitting into the central groove of the mandiubular (or lower) first molar, and where the other teeth may have additional problems such as spacing, crowding, or vertical alignment issues such as over or under eruption.

Class II: Distocclusion where the mesiobuccal cusp tip of the upper first molar is anteriorly or forwardly positioned ahead of the mesiobuccal groove of the lower first molar and instead is anterior to it (often called a large "overbite" or technically a large overjet of the upper teeth anterior to the lower dentition). Again, the Class II malocclusion can be a result of the skeletal components of the upper jaw (maxillary segment) and/or lower jaw (mandibular segment) being malaligned or may additionally involve the dentition being maligned (above). Class II malocclusion also has two divisions where: division 1 has molar relationships such as Class II with the anterior teeth protruding; and division 2 has molar relationships like Class II but the central incisor teeth are retroclined and the lateral incisor teeth are seen anteriorly overlapping the centrals. It is important that the upper first molars are often and generally displaced and rotated mesially in Class II malocclusions taking up more space in the upper dental arch and contributing to the overjet, requiring correction.

Class III: Mesiocclusion is found in patients where the upper molars are placed not in the lower molar mesiobuccal groove but where the upper molar is located posteriorly to the lower molar central groove and often referred to as an underbite.

A distalizer applies to the treatment generally, of the upper teeth and upper jaw with a Class II overjet condition above but can also be used in the lower jaw or teeth by reversing the direction of force to be used in the correction of a Class III malocclusion.

Rotation and distalization of upper molars, with segmented archwires and orthodontic brackets (braces) in conjunction with Class II, up and down, inter-arch, or inter-maxillary elastics with or without headgear or fixed functional appliances (which hold the lower jaw forward and downward) is not new. Distalizers have been used to correct one or more of the malocclusions described above for more than half a century.

In prior art distalizers one common, and most clinically visible complication for patients that has been recognized, is that both upper canines become over-extruded, elongating the canine out of its tooth socket due to the elastic traction. This is in addition to unfavorable canine crown tipping that has been observed clinically (above). This poses a serious aesthetic and functional issue as interferences in the occlusion (bite) for patients with prior distalizers. Once upper canines have been over-extruded they are difficult to re-intrude because they are the longest rooted teeth in the maxilla.

It is ideal biomechanically to push the molar horizontally and vertically from as close to the centers of resistance of the molar, the entire dentition, and the maxilla that are all located closer to the upper part of the roots. For this reason, it is preferable and indicated in orthodontic biomechanics to translate the molar roots, or bodily move the molar posteriorly by pushing more distally (location of mid-hook on bar, see FIG. 2) in the horizontal dimension, and from a more gingival location that is closer vertically to the three centers of resistance, compared to prior distalizers.

Finally, the preferred method of molar distalization is to apply as direct a force to the molar as possible. (Conversely, to prevent canine over-extrusion it is ideal to avoid direct force on the canine at the anterior end). The method of distalizing the molar in prior distalizers is indirect vs. direct force because the prior art uses a force on the anterior end of the canine rather than the force being closer to the molar that requires movement. In the prior art this results in a domino-effect of indirect force from the canine crown, and canine root encased in bone, to the relatively straight bar mesiodistally and sphere (and to the obstructing two middle premolar teeth) resulting in a dissipated force to the molar tube.

Overall the goal is to prevent upper canine over-eruption while additionally, applying the inter-arch elastic force more posteriorly (distally) and higher (gingivally) to be closer biomechanically to the 3 centers of resistance for greater, bodily molar movement. Conversely, from a transverse perspective it is also ideal to push on the molar tube a further distance to the buccal away from the center of resistance of the molar. These improvements would also make canine and bodily molar movements more stable long-term, precluding relapse in retention.

International publication number WO 2017/070799 to Voudouris, the contents of which are herein incorporated by reference in their entirety, is directed to an Orthodontic Bracket with a Sliding Molar Distalizer. Furthermore, international application number PCT/CA2017/000053 to Voudouris, the contents of which are herein incorporated by reference in their entirety, is directed to an Orthopedic-Orthodontic Molar Distalizer.

In addition to canine over-eruption, there is another long-standing problem in popular Class II mandibular advancers or correctors. The lower incisors tend to flare forward with the use of these up and down or inter-maxillary traction elastics that stretch between the upper and lower jaws and teeth diagonally.

In conjunction with an upper distalizer, an invisible clear liner-type plastic retainer, has been used in the lower arch in conjunction with a bondable button on the lower molar (where a Class II intermaxillary traction elastic is placed or anchored, see FIG. 2). This invisible retainer is placed in order to try to keep the lower arch ideally from second molar to second molar at least splinted together, or anchored together in effect to try to prevent the lower incisors from proclining forward but this has only limited assistance if any.

The whole arch tends to move forward molar-to-molar along with the entire invisible retainer.

For that matter, the same problem occurs when there are full lower brackets second molar-to-second molar with a lower rectangular wire for added anchorage. The whole set of lower braces move forward with lower incisors into the lip with a domino effect starting from the second molars moving forward to the incisors bilaterally. The reason is that the heavy-force Class II inter-arch elastic forces over-power the dentoalvelar bone housing of the lower dentition consistently and commonly. This can often also lead to periodontal recession or gum recession at the front, or labial of the lower incisors.

There is a need for an orthodontic device that overcomes at least some of the above identified problems.

SUMMARY OF THE INVENTION

In one aspect of the present invention, there is provided an orthodontic lip advancer for use with an orthodontic upper anchoring appliance. The orthodontic upper anchoring appliance may have a first hook for attaching an inter-arch traction elastic thereon, the traction elastic may extend diagonally to attach to at least one lower posterior orthodontic bracket having a second hook. The traction elastic imparts a distal-to-mesial force on the lower arch causing labial flaring of the lower arch anterior teeth. The orthodontic lip advancer comprises: a liner-type plastic retainer sized and shaped for use with a lower dental arch; and a bumper extending labially from the retainer at an anterior portion thereof and having a thickness for pressing against the patient's lip thus stretching the lip labially causing the lip muscles to react pushing back with a lingual second force opposite the first force thus substantially preventing the anterior teeth from flaring labially.

In one embodiment, the bumper comprises a plurality of portions each corresponding to an anterior tooth portion of the retainer. In one embodiment, the plurality of portions comprise eight portions corresponding to four incisors, two canines, and two premolars on the lower arch. In another embodiment, the plurality of portions comprise six portions corresponding to four incisors and two canines on the lower arch. In yet another embodiment, the plurality of portions comprise four portions corresponding to four incisors on the lower arch.

In one embodiment, the bumper is integrally formed with a labial wall of the retainer. In another embodiment, the bumper is attachable to a labial wall of the retainer.

In one embodiment, the bumper extends: from a lower right first premolar to a lower left first premolar, from a lower right canine to a lower left canine, or from a lower right lateral incisor to a lower left lateral incisor.

In one embodiment, the bumper is formed of thickened plastic material. In another embodiment, the bumper is hollow having a space between a more lingually positioned lining fitting over the lower anterior teeth and a labial lining in contact with the lip.

In one embodiment, the bumper extends gingivally-occlusally for the full height of the anterior teeth. In another embodiment, the bumper has a height in the gingival-occlusal direction that is shorter than the full height of the anterior teeth. The bumper may be positioned close to an occlusal edge of the retainer such that the second force is applied to an incisal part of each of the anterior teeth for producing greater moment forces on the incisors.

In one embodiment, the orthodontic lip advancer may further comprise a plurality of cosmetic bonding resin sections bonded to the labial surface of the anterior teeth for providing additional thickness to the lip advancer for labially pressing against the patient's lip.

In another aspect of the present invention, there is provided an orthodontic lip advancer for use with a plurality of brackets attached to the teeth of a patient's dental arch and a main archwire passing through archwire slots formed within the first plurality of brackets. The orthodontic lip advancer comprises: an auxiliary archwire extending mesiodistally between a right one of said plurality of brackets and a corresponding left one of said plurality of brackets; and a bumper formed on the auxiliary archwire for applying pressure labially to a corresponding patient's lip.

In one embodiment, the auxiliary archwire is U-shaped.

In one embodiment, the auxiliary archwire is extending mesiodistally and labial to the main archwire.

In one embodiment, the auxiliary archwire is welded to the main archwire at two or more weld points.

In one embodiment, the auxiliary archwire is welded to one of: the main archwire mesial of the patient's canines, the main archwire distal of the patient's premolars, and the archwire distal of the patient's canines.

In yet another aspect of the present invention, there is provided an orthodontic lip advancer for use with: a first plurality of brackets attached to the teeth of the upper arch and a first archwire passing through archwire slots formed within the first plurality of brackets, a second plurality of brackets attached to the teeth of the lower arch and second archwire passing through archwire slots formed within the second plurality of brackets, and a traction elastic stretched diagonally between a canine bracket on the upper arch and a lower molar bracket on the lower arch for imparting force on the upper ach for treating an overbite. The orthodontic lip advancer comprises: an auxiliary U-shaped archwire extending mesiodistally between a right one of said second plurality of brackets and a corresponding left one of said second plurality of brackets; and a bumper formed on the auxiliary archwire for applying pressure labially to a corresponding lip.

BRIEF DESCRIPTION OF THE DRAWINGS

Embodiments of the present invention will be presented with reference to the attached drawings in which.

DETAILED DESCRIPTION OF THE EMBODIMENTS

Innovative orthodontic appliances for restricting lower incisor proclination when using Class II intermaxillary traction or functional mandibular advancers, for instance, are presented, by way of example only and not limitation, with reference to the attached drawings.

An orthodontic lip advancer may be used to keep the lower front teeth from flaring (or proclining) forward when using an orthodontic upper anchoring appliance utilizing traction elastics. In such an appliance, the traction elastics attach to a hook on the anchoring appliance, extend diagonally, and are anchored to the lower arch by attaching to a hook on a bracket attached to a lower molar. The appliance may be used on both the right and left sides and tends to push the lower arch labially. One example of such appliance is an upper molar distalizer, as discussed herein.

Figure 1:
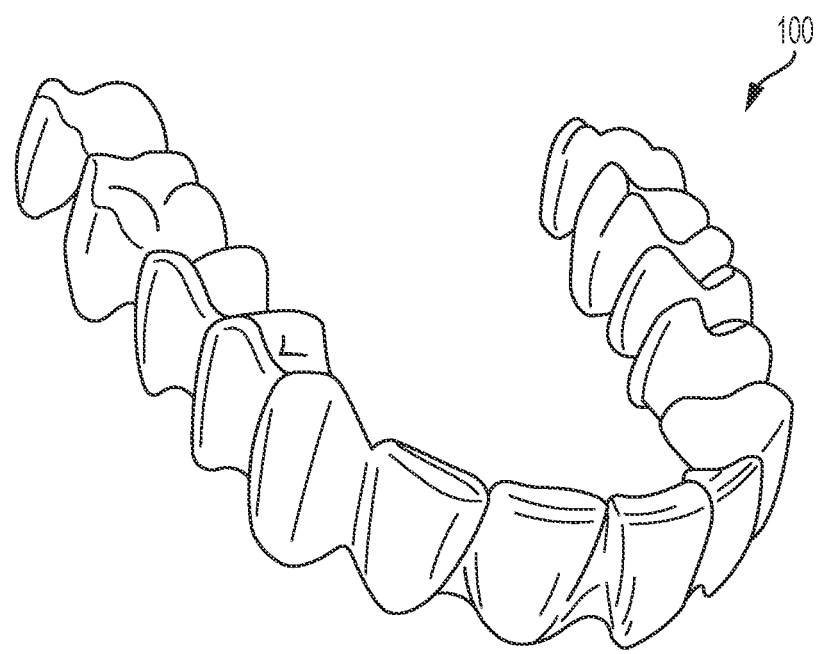
FIG. 1 is a perspective view of a prior art lower invisible clear liner-type plastic retainer for use with the lower arch.
Figure 2:
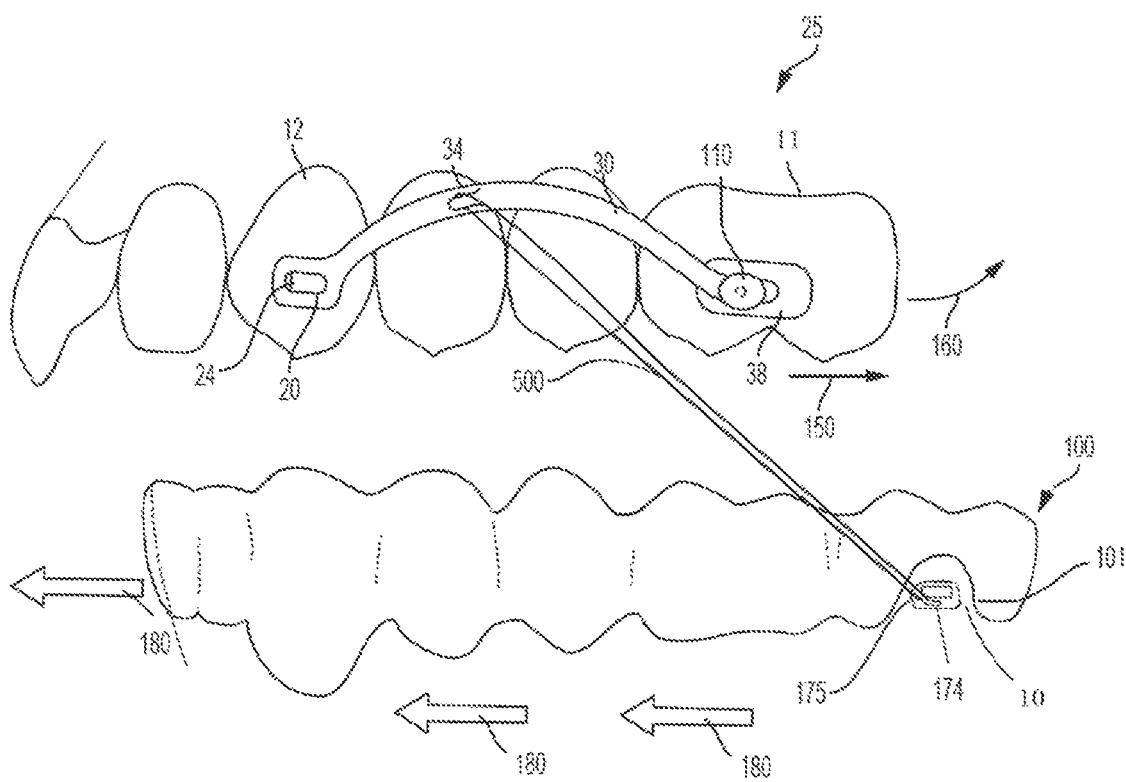
FIG. 2 is a prior art molar distalizer shown with a prior art lower invisible clear liner-type plastic retainer such as the one from FIG. 1 with heavy Class II, inter-arch, up and down elastics applied pushing the lower arch forward in a distal to mesial direction.
Figure 3A:
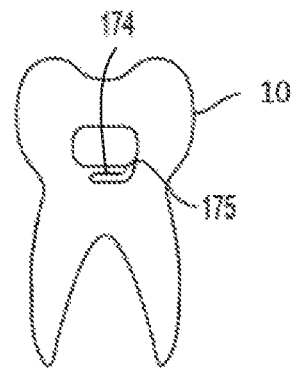
FIG. 3A is a buccal view of a lower molar tooth having a bracket featuring a hook attached thereto.
Figure 3B:
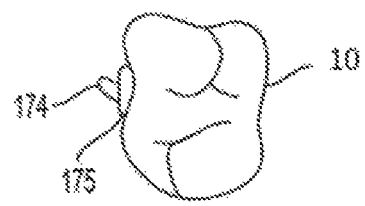
FIG. 3B is an occlusal view of the molar tooth and bracket of FIG. 3A.
Figure 3C:
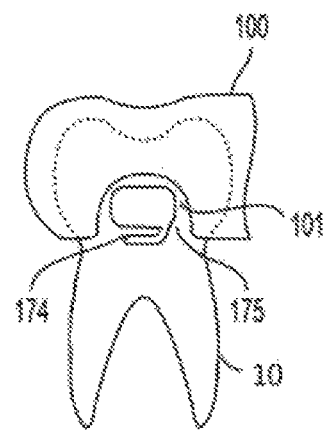
FIG. 3C is a buccal view of the molar tooth and bracket of FIG. 3A shown in conjunction with a portion of a plastic retainer having a recess to accommodate the bracket.

FIG. 1 is a perspective view of an invisible clear liner-type plastic tray or retainer ("retainer") 100 for use with the lower arch. FIG. 2 is a side, or buccal view of an upper molar distalizer 25 used in conjunction with a retainer 100 similar to that of FIG. 1. With reference to FIG. 2, molar distalizer 25 features: a canine attachment 20 for attaching to a canine tooth 12, which may optionally have an orthodontic tube 24 formed or mounted thereon; a molar component 38 for attachment to a first molar tooth 11; and a curved rod 30 extending mesiodistally between the canine attachment 20 and the molar component 38. The rod 30 attaches to the molar component by suitable means, such as bolt 110 which permits rotation of the molar component with respect to the rod 30 for imparting rotational force on the molar tooth, when the distalizer is moved in the distal direction by traction means, such as traction elastic 500. The rod 30 has a hook 34 suitable for receiving one end of a traction elastic 500 used to impart distalization force on the distalizer 25. Another end of the traction elastic is received by a hook 174 on bracket 175 attached to a lower second molar 10. FIGS. 3A-3C depict the positioning of bracket 175 on the second molar tooth 10, and the orientation of hook 174 which may be connected to or formed on bracket 175. Alternatively, a bondable round button with undercuts, and thereby replacing hook 174, may also be used on the lower second molar (not shown).

Turning back to FIG. 2, the traction elastic 500 extends diagonally between hooks 34 and 174, and is stretched such that it imparts distalization force in the direction denoted by arrow 150 on the upper molar distalizer 25. As a result, the molar component 38 rotates with respect to the rod 30 and accordingly the first molar 11 is rotated distally, and gingivally therewith in the direction denoted by arrow 160. The traction elastic 500, however, also imparts force on bracket 175 through hook 174. One component of this force is in the distal-to-mesial direction denoted by arrow 180. This force is transferred by domino effect from the lower second molar 10 to the first molar, to the premolars, and to the anterior teeth. This causes forward (labial) flaring (or proclination) of the anterior teeth, such as the incisors, which is undesirable. To lessen the effect of the force 180, an invisible plastic retainer such as retainer 100 of FIG. 1 may be used on the lower arch. The retainer 100 may have a recess 101 formed in a buccal wall thereof where it fits on the second molar 10. The recess 101 accommodates bracket 175 which has hook 174 formed thereon or attached thereto. This is also shown in FIG. 3C. However, as discussed above, the invisible retainer 100 is not effective in restricting the forward labial flaring (or proclining) of the lower anterior teeth under the force 180 caused by the traction elastic 500. This is particularly because the lower incisors are the thinnest, tapered and single-rooted teeth, making them easier to tip forward.

Figure 4A:
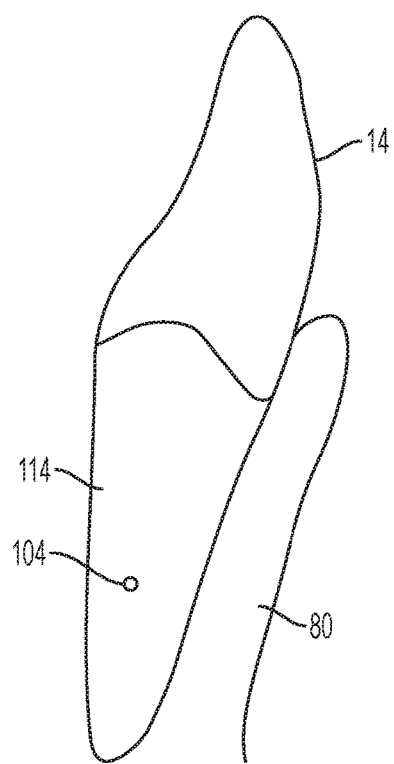
FIG. 4A is a side sectional view of an incisor tooth with labial gum tissue.
Figure 4B:
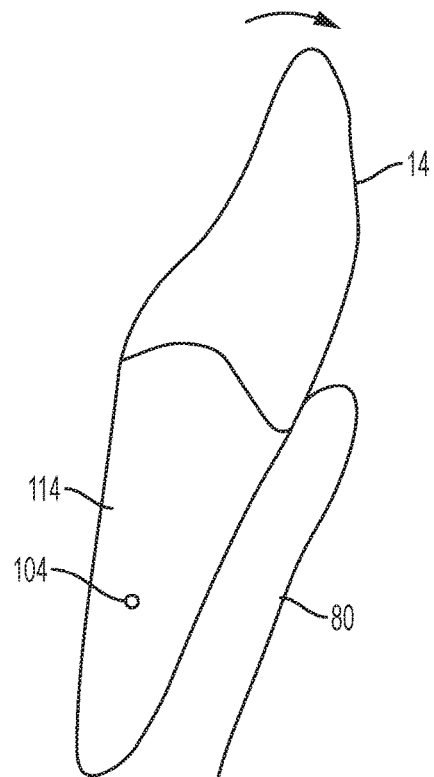
FIG. 4B is a side sectional view of the incisor tooth of FIG. 4A after undergoing some labial flaring and tipping around its center of resistance causing some corresponding gingival recession.
Figure 4C:
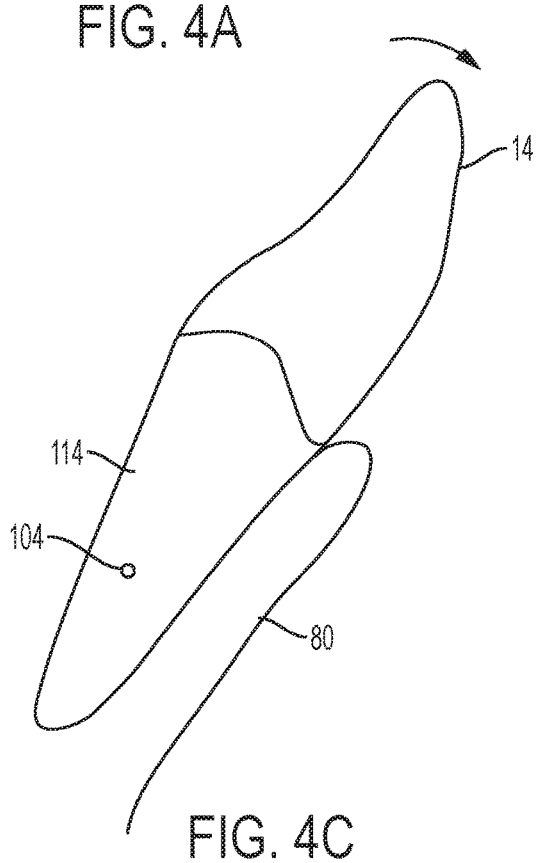
FIG. 4C is a similar view to FIG. 4B but showing more flaring and tipping of the incisor and more corresponding gingival recession.
Figure 4D:
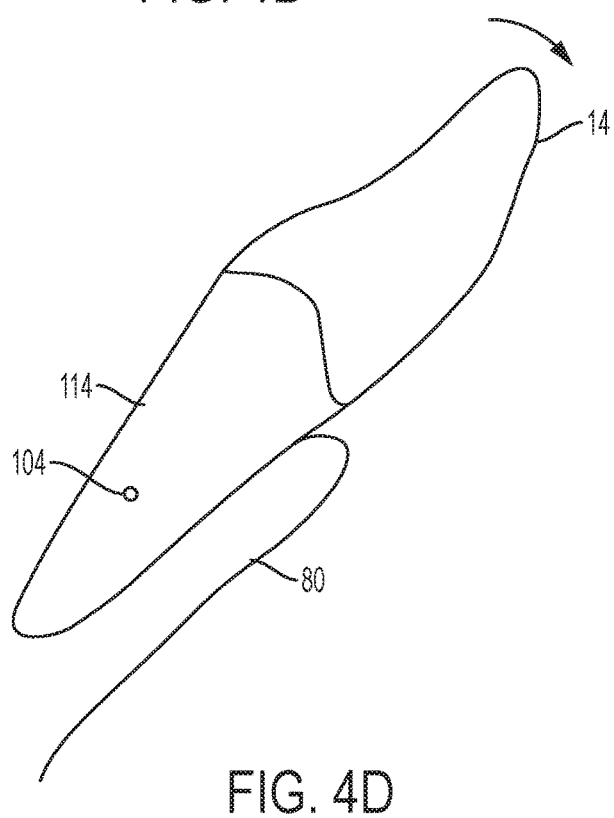
FIG. 4D is a similar view to FIG. 4B but showing even more flaring and tipping of the incisor and even more progressive corresponding gingival recession.

FIGS. 4A-4D illustrate how the labial flaring (or proclination) of an incisor tooth causes gingival recession to the point of exposing the roots. FIG. 4A shows a normal incisor tooth 14, having a root 114 and a centre of resistance (CR) 104. The labial side of the gum tissue 80 is shown. FIG. 4B shows the incisor tooth 14 of FIG. 4A after undergoing some labial flaring mostly by tipping around the centre of resistance 104. The gum tissue 80 is shown to recede with respect to the tipping of the incisor 14. As more flaring and tipping occurs, as shown in FIG. 4C, the gum line recedes further lower (in the gingival direction). In FIG. 4D, the labial tipping or proclination of the incisor is greater, and accordingly the gingival recession is more severe that the root 114 is exposed.

To address the above problem with labial flaring, an orthodontic lip advancer is presented. Lip muscles such as: orbicularis oris, mentalis are strong muscles which react, when stretched, by producing an opposing force. Accordingly, a device which advances or stretches the lips in the labial direction causes the lip muscles and peri-connective tissues to react by producing a posteriorly-directed, lingual opposing force.

Figure 5A:
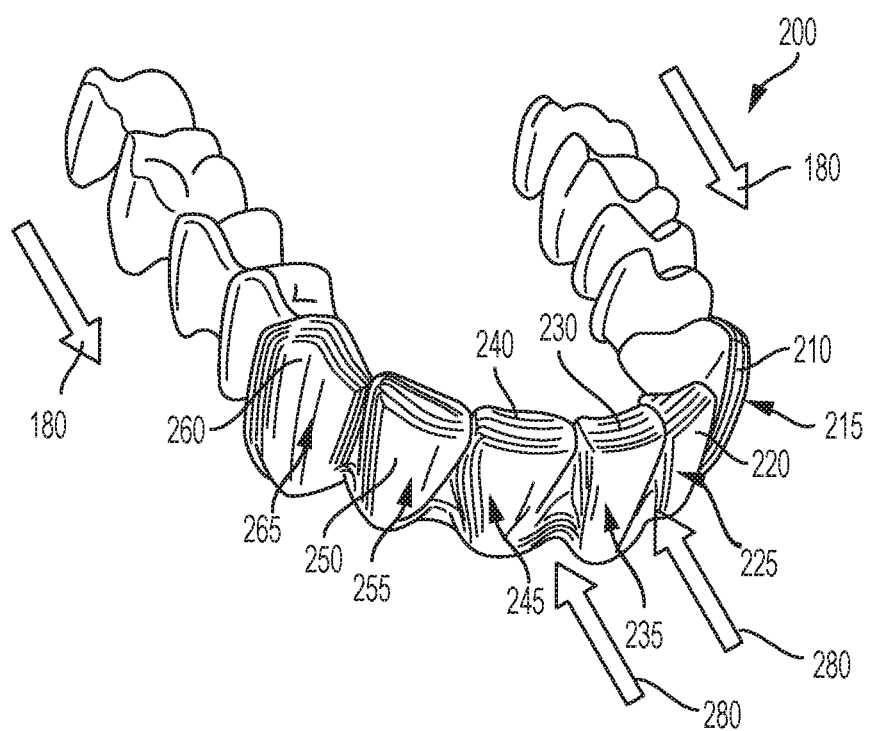
FIG. 5A is a perspective view of an orthodontic lip advancer featuring an invisible clear liner type plastic retainer for use with the lower arch and including a lip advancer, the liner having a thicker, clear plastic material, or a bumper, to the front (labial side) of the invisible clear retainer for advancing by stretching, and thereby activating a patient's lips including the muscles, and other surrounding tissues around the mouth opening called peri-connective tissues, in accordance with an embodiment of the present invention.
Figure 5B:
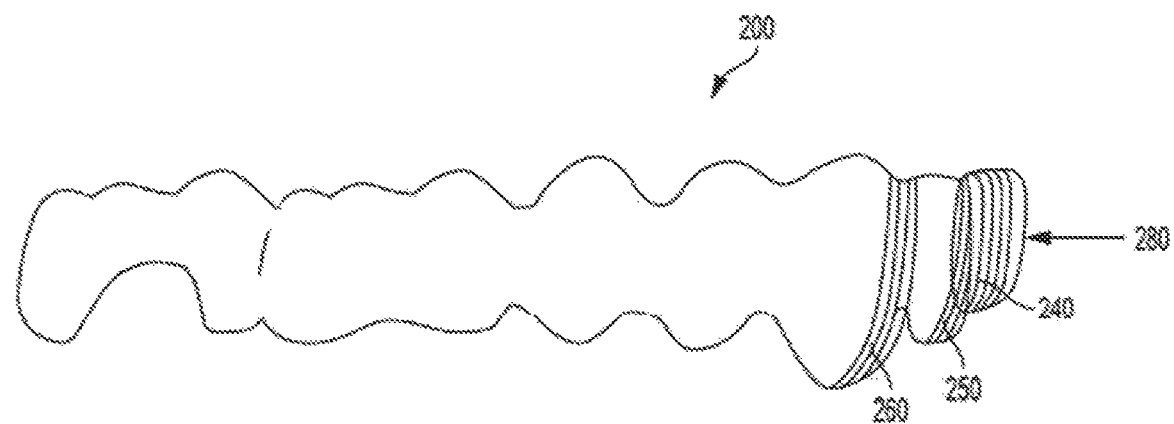
FIG. 5B is a right buccal side view of the orthodontic lip advancer of FIG. 5A, showing bumper sections corresponding to the right canine and two right incisors.
Figure 5C:
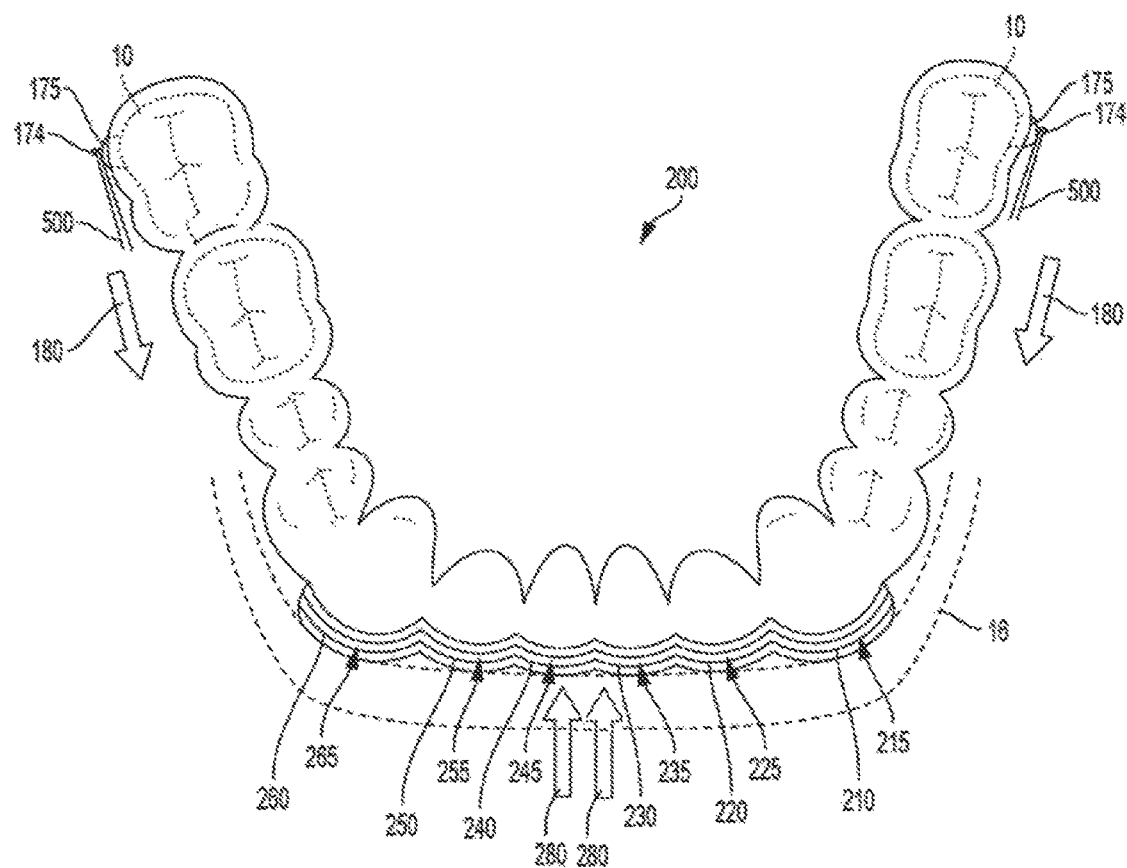
FIG. 5C is an occlusal view of the orthodontic lip advancer of FIGS. 5A-5B showing the liner having a thicker, clear plastic material, or bumper, to the front (labial side) of the clear retainer, and also showing the lip forces.

With reference to FIGS. 5A-5C a lower plastic-type orthodontic lip advancer 200 is shown (for use with either for instance an upper molar distalizer, or upper brackets not shown). The orthodontic lip advancer 200 comprises an invisible clear liner type plastic retainer shaped to fit a patient's lower arch. When used with an upper molar distalizer, such as the one shown in FIG. 2, the lower end of the traction elastic imparts a diagonal force on the lower molar to which it is attached, as discussed above with respect to FIG. 2. This diagonal force has a distal-to-mesial component denoted by arrow 180. The force component 180 is transferred to the anterior of the lower dental arch by domino effect through the first molar and premolars. This causes forward (labial) flaring or tipping of the lower arch anterior teeth including the canines and incisors. The lip advancer 200 is sized and shaped to fit the lower arch of a patient, and is aimed at countering the distal-to-mesial force which causes the anterior teeth flaring. In one embodiment, the lip advancer 200 has a thicker, clear plastic material (for aesthetics), or a bumper, formed on or located at the front (labial side) of the invisible clear retainer. In one embodiment in FIGS. 5A-5C, the thicker clear plastic material, or bumper, is comprised of six sections 210, 220, 230, 240, 250, and 260, and extends from approximately the canine-to-canine region. The six bumper sections each corresponds to an anterior tooth portion of the retainer 200. Bumper portions 210 and 260 are formed labially at the canine portions of retainer 200, whereas portions 220, 230, 240, and 250 are formed labially at the incisor portions of retainer 200. In another embodiment (not shown), the bumper may be formed of only four sections covering the incisor region only. In yet another embodiment (not shown), the bumper may be formed of eight sections extending from the right first premolar to the left first premolar. In one embodiment in FIGS. 5A-5B, the thicker clear plastic material (or bumper) is in the form of full height occlusal-gingival bumper sections. The bumper sections labially advance or stretch the lower lip and other peri-connective tissues, and press up against the lower lip muscles in particular. The reaction to expanding the lower lip forward (labially), by the bumper of the orthodontic lip advancer, is that the lower lip muscles react and push back with a reaction force generally in the lingual direction 280. The lip reaction forces 215, 225, 235, 245, 255, and 265 represent the individual components of the reaction force applied to the various bumper sections 210, 220, 230, 240, 250, and 260, respectively by a corresponding portion of the stretched lip muscles and peri-connective tissues. The lip reaction forces result in an equivalent reaction force such as 280 in the lingual direction. The reaction force in direction 280 counters the traction elastic force component 180 which attempts to flare (or procline) the anterior teeth of the lower arch labially. Advantageously, that countering effect by the reaction force in the lingual direction component 280 restricts the lower incisors from flaring (or proclining) in the forward (labial) direction. This, in turn, greatly reduces the incidence of significant gingival recession that can result from the labial tipping of the lower front incisors.

FIG. 5B is a right buccal side view of the lip advancer 200 of FIG. 2, showing the full occlusal-gingival bumper sections 260, 250, and 240 corresponding to the right canine, right lateral incisor, and center right incisor, respectively. The arrow denoted by 280 shows the direction of the lingual reaction force imparted by the lip muscles, better seen in FIG. 5C (dotted line), reacting to the labial advancement of the lip and peri-connective tissues by the bumper sections.

FIG. 5C is an occlusal view of the orthodontic lip advancer 200 applied to a lower dental arch, when used with an upper molar distalizer (as was previously shown in FIG. 2). The second molars 10 each has attached thereto a bracket 175 on the buccal side thereof. Bracket 175 has a hook 174 to which a lower end of a traction elastic 500 is attached, as described above with respect to FIG. 2. The traction elastics 500 on both sides of the dental arches each imparts a force which has a distal-to-mesial component in the direction of arrows 180. The lip advancer 200 comprises occlusal-gingival bumper sections 210, 220, 230, 240, 250, and 260 to the front (labial side) of its retainer. The bumper sections serve to advance the patient's lower lip 16 in the labial direction. As a result, the lip muscle reacts by imparting a resistance force in the lingual direction. Specifically every bumper section pressing against a portion of lip 16 to stretch it in the labial direction faces a corresponding reactive-type resistance force caused by the lip muscle resisting the lip stretching. Accordingly, bumper section 210 receives a resistance force 215, bumper section 220 receives a resistance force 225, bumper section 230 receives a resistance force 235, bumper section 240 receives a resistance force 245, bumper section 250 receives a resistance force 255, and bumper section 260 receives a resistance force 265. Altogether forces 215, 225, 235, 245, 255, and 265 are equivalent to a force 280 in the labial-to-lingual direction which counters the force components 180 that would otherwise cause the labial flaring of the anterior teeth. Advantageously, the resultant force on the anterior teeth in the labial direction is substantially reduced, and labial flaring of the anterior teeth with gingival recession is averted or significantly reduced.

Figure 5D:
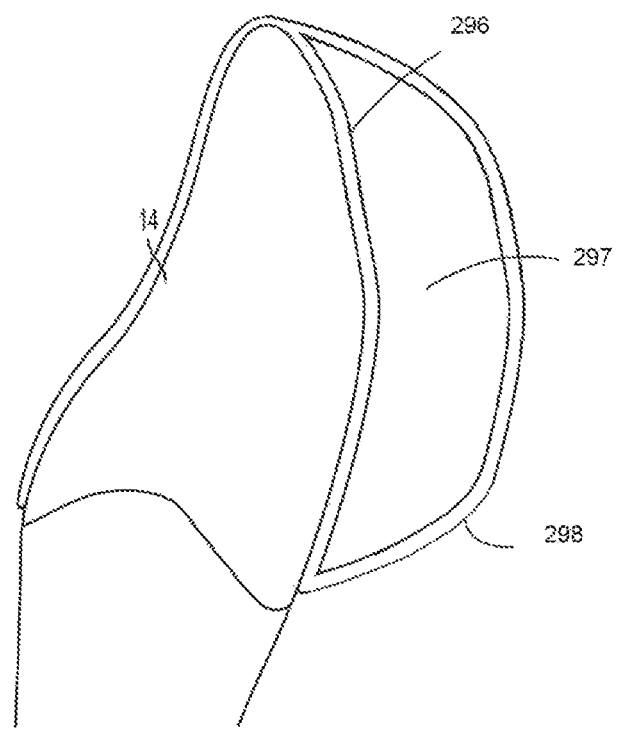
FIG. 5D is a side view of a lower central incisor with the orthodontic lip advancer similar to FIGS. 5A-5C, but showing the liner having an air space between the thin clear plastic material directly on the lower incisor and another thin plastic material in contact with the lip at the front of the clear retainer (labial side)

FIG. 5D, is a side cross-sectional view through a lower incisor 14 showing a lip advancer connected thereto, in accordance with yet another embodiment of the present invention. In FIG. 5D, the lip advancer features hollow bumper section having a bubble-like air space 297, or void between the morel lingually positioned lining 296 which fits on the anterior teeth, and the outside (labial) external lining 298 which pushes against the lip. In this embodiment, the reactive lip forces and peri-connective tissues compress the air within the bubble, or space to further push the lower incisors lingually in FIG. 5D. Advantageously, as explained earlier, the resultant force on the anterior teeth in the labial direction is substantially reduced, and labial flaring of the anterior teeth with gingival recession is averted or significantly reduced.

Figure 6:
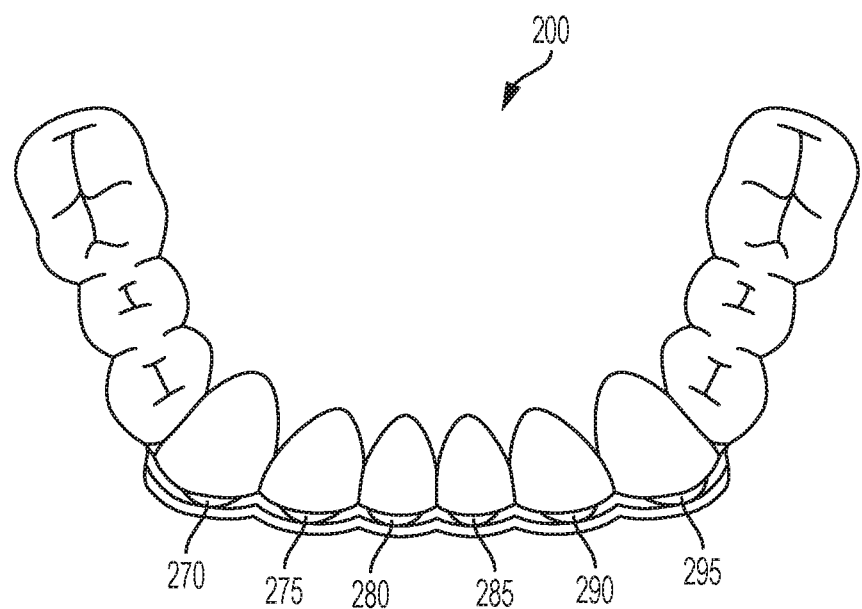
FIG. 6 is an occlusal view of the thick orthodontic lip advancer similar to FIGS. 5A-5C, but shown here for example, from lower first molar-to-lower first molar and, notably with cosmetic bonding resin bonded to the anterior teeth.

FIG. 6 shows another embodiment of an orthodontic lip advancer comprising a liner retainer as before, this time for instance from lower first molar to lower first molar, but also in which separate cosmetic bonding resin sections 270, 275, 280, 285, 290 and 295 are bonded to the six anterior teeth (canines and incisors) prior to the patient wearing the thick invisible liner with lip advancer overtop. Advantageously, these resin sections provide additional thickness to the thick, smooth bumper sections thus increasing the advancement of the lip and accordingly increasing the resistance (or counter) force by the lip muscle in the lingual direction, than cosmetic bonding alone can provide without the thick lip bumper. This further restricts lingual flaring (or proclining) of the anterior teeth as described earlier. Furthermore, the bonding resin sections provide a better fit of the liner retainer onto the patient's lower arch by providing a tighter fit between the teeth and the retainer.

Figure 7:
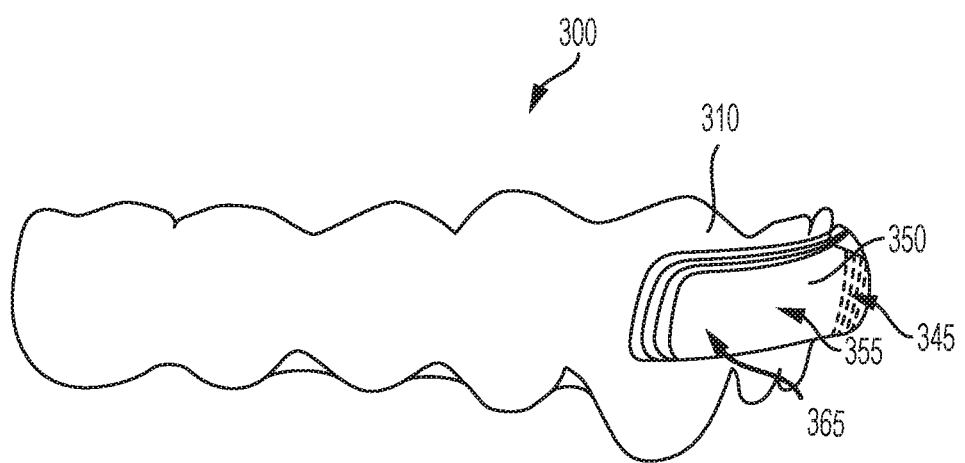
FIG. 7 is a right buccal side view of an orthodontic lip advancer featuring an invisible clear liner type plastic retainer and a bumper having a reduced height, corresponding to the right canine and two right incisors, in accordance with another embodiment of the present invention.
Figure 11:
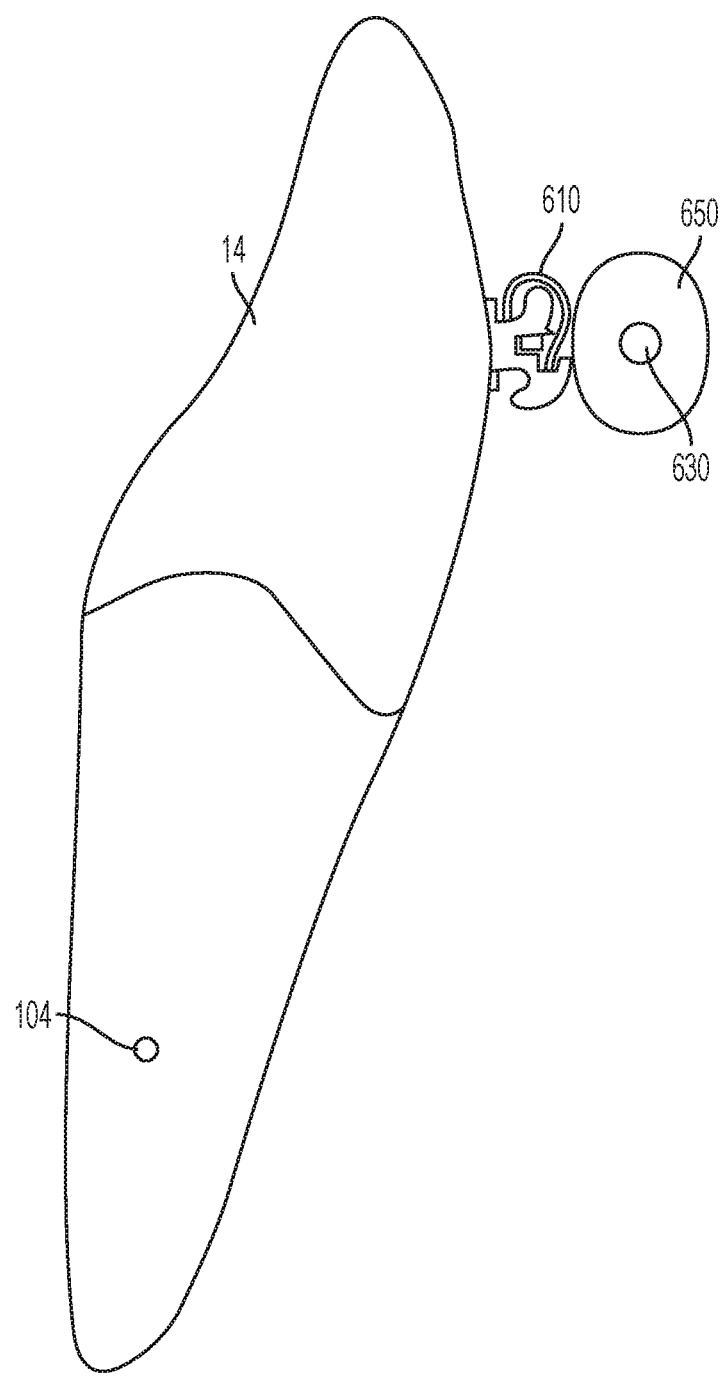
FIG. 11 is a sectional right side view of a lower arch featuring the plurality of brackets and archwire, and the separate metal and acrylic orthodontic lip advancers of FIGS. 8 and 10, and taken at line 9-9 of FIG. 10.

With reference to FIG. 7 an orthodontic lip advancer 300 having an invisible clear liner type plastic retainer, is shown, in accordance with another embodiment of the present invention. The orthodontic lip advancer 300 has sections of a bumper of thicker material of which the ones corresponding to the right canine and two right incisors are visible in FIG. 7. In this embodiment, the lip advancer 300 has a shorter height bumper 350 which extends mesiodistally and is positioned closer to the occlusal edge 310 of the labial section of the lip advancer retainer. The height of bumper 350 does not extend to the full height of the anterior teeth. However, the positioning of the bumper is closer to the occlusal edge 310 of the lip advancer. This serves to localize the forces exerted by the muscles of the lips directly on the upper (incisal) part of the lower anterior teeth. The localization of forces on the incisal part of the lower anterior teeth provides for better retraction since the forces 345, 355, and 365 exerted by the lip muscle on the lip advancer are further from the centers of resistance of the lower anterior teeth, which are located about ⅔ down the length of the lower anterior teeth roots, as shown in FIG. 11. Accordingly, the moment forces exerted on the incisors have a greater lever arm (from the bumper section to the center of resistance), and advantageously can better counter the distal-to-mesial forces of the traction elastic discussed above thus greatly minimizing the labial flaring of the lower anterior teeth.

Figure 8:
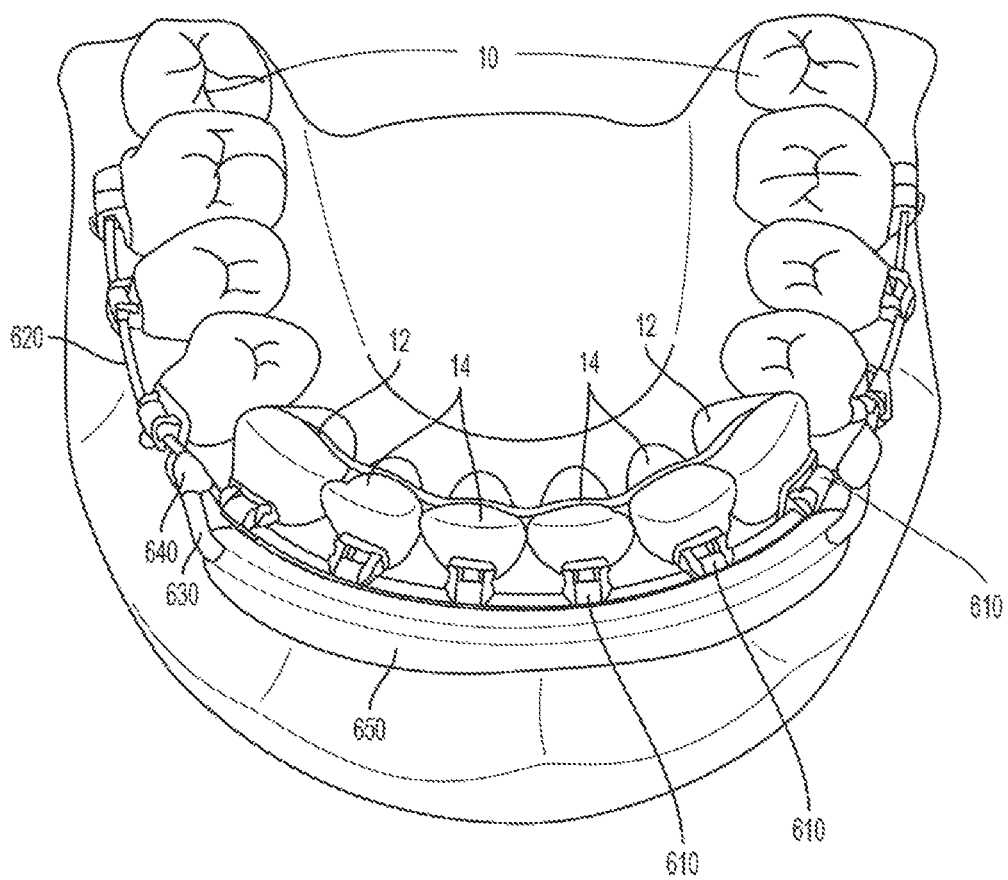
FIG. 8 is an occlusal-perspective view, of a lower arch featuring a separate metal and acrylic orthodontic lip advancer, used in conjunction with an archwire and in contact with a plurality of brackets, in accordance with yet another embodiment of the present invention.
Figure 9:
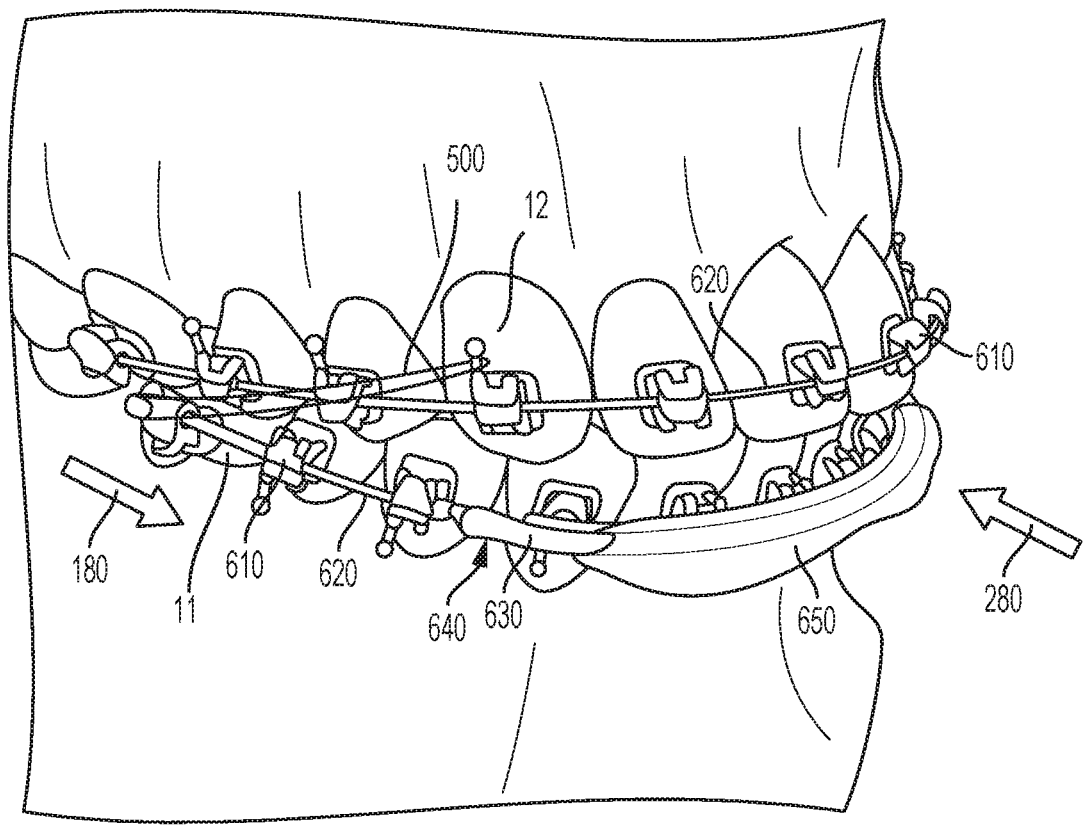
FIG. 9 is right side perspective view of upper and lower arches each having a plurality of brackets connected by an archwire, a traction elastic diagonally connecting the upper and lower plurality of brackets, and featuring the separate metal and acrylic orthodontic lip advancer of FIG. 8, applied to the lower arch.

With reference to FIGS. 8-11, there is provided yet another embodiment of the present invention. FIG. 8 is an occlusal-perspective view, of a lower dental arch featuring a separate metal and acrylic orthodontic lip advancer, used in conjunction with an archwire and a plurality of brackets. A plurality of orthodontic brackets 610 are attached to the teeth of the lower arch from the right first molar 10 to the left first molar 10. An archwire 620 is connected between the brackets 610 passing through archwire slots therein as known in the art. A typical use of this arrangement of brackets is shown in FIG. 9. In FIG. 9, another plurality of brackets and archwire are attached to the upper arch. To treat an overbite, for example, an elastic band 500 is stretched diagonally, in a Class II inter-arch pattern, between a bracket on the upper canine 12 and a bracket on the lower first molar 10. Each of the brackets may have a hooking element suitable for receiving the traction elastic. The force of the traction elastic on the upper bracket of canine 12 and the archwire 620 connecting that bracket to other brackets 610 on the upper dental arch, pull the anterior teeth lingually for treating an overbite condition. Unfortunately, the traction elastic also imparts a distal-to-mesial force on the lower second molar 10. This force, denoted by arrow 180, is transmitted by domino-effect to the premolars, and then to the anterior teeth causing the labial flaring of the single-rooted anterior teeth discussed above.

Figure 10:
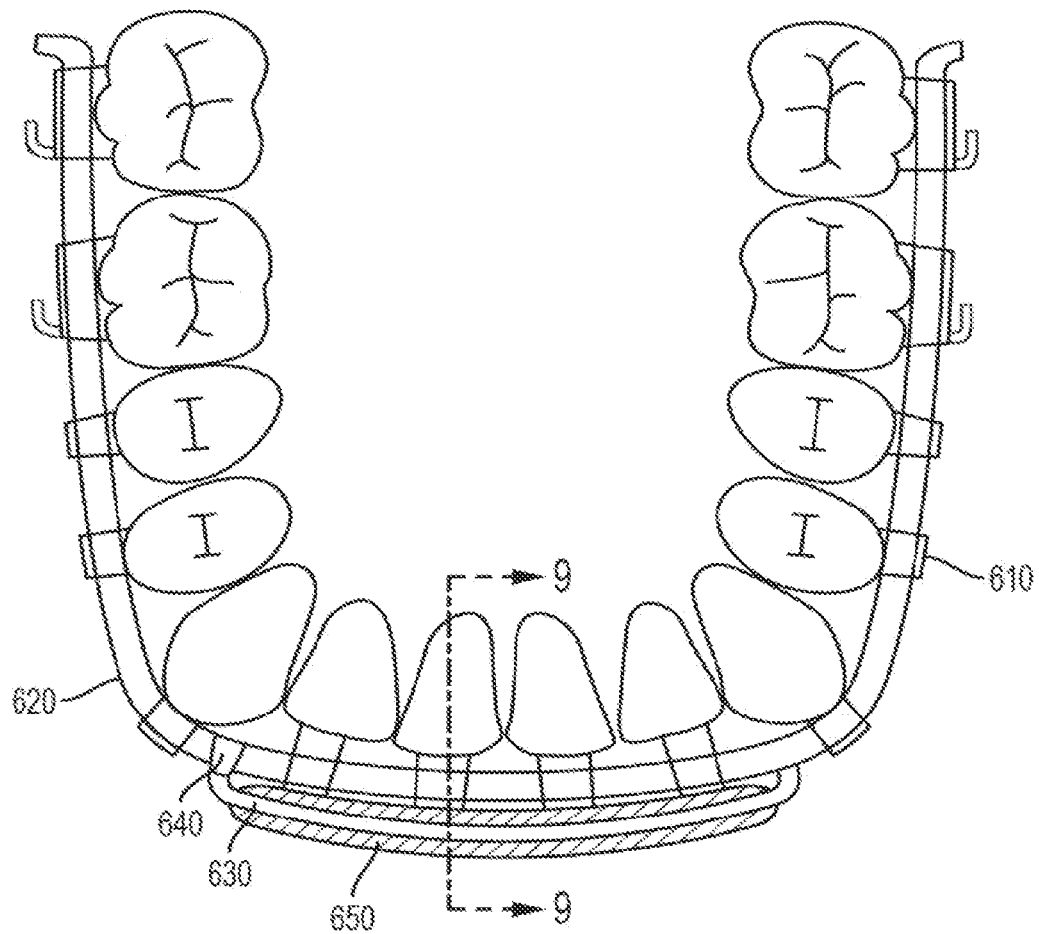
FIG. 10 is an occlusal and partially sectional view of a lower arch featuring the plurality of brackets and archwire and the separate metal and acrylic orthodontic lip advancer that is similar to FIG. 8 but shorter since it is welded mesial of the canines.

To overcome the labial flaring a metal and acrylic orthodontic lip advancer is shown with reference to FIGS. 8-10. The separate, metal with acrylic orthodontic lip advancer shown is composed of a generally shorter auxiliary U-shaped thick archwire 630 extending mesiodistally from the distal of the left and right lower canine brackets 610, and from distal of the canine-to-canine region in FIGS. 8 and 9. The auxiliary, generally U-shaped thick archwire 630 of the lip advancer is, most importantly, in contact with the lower anterior brackets (braces) 610, and positioned within the thickened clear material in the shape of a bumper 650 formed on the auxiliary U-shaped archwire 630. The auxiliary U-shaped archwire 630 and bumper 650 are positioned labial to the main long rectangular archwire 620 such that the bumper 650 applies pressure labially to a corresponding lip for advancing and stretching it. In one embodiment, the U-shaped thick archwire 630 is welded, at weld points 640, distal to the canines 12, to the main long rectangular archwire 620 of the brackets (braces) 610 set-up on the lower arch. In another embodiment in FIG. 10, the U-shaped thick archwire 630 may be welded mesial to the canines. In yet another embodiment (not shown), the U-shaped thick archwire 630 may be welded distal to the first premolars. The pressure applied by the lip bumper 650, which is positioned in front of (labial to) the lower incisors 14, once again, expands and advances the lip in the labial direction, causing the lip muscles to push back with a reaction force in the lingual direction, denoted by arrow 280. The resistance or reaction force 280 counters the force 180 to restrict the forward (labial) flaring of the anterior teeth. An orthodontist can choose between canine-to-canine, lateral incisor-to-lateral incisor, or premolar-to-premolar positions for the U-shaped auxiliary archwire 630 and bumper 650. The premolar-to-premolar positions may be more effective since it allows more teeth to be contacted namely the premolars plus canines.

Advantageously, the orthodontic lip advancers presented, prevent the complications of lower incisor proclination with gum recession, and prevent the high relapse rate back to the original lower incisor crowding.

Although the lip advancer was shown used with the lower arch to advance the lower lip of a patient, it is equally usable with the upper arch to advance the upper lip when used, for example, with a lower molar distalizer.

Although the orthodontic lip advancer was shown being used with a lower plurality of brackets while treating an overbite condition, it is equally usable with an upper plurality of brackets while treating an underbite condition.

Although the orthodontic lip advancer was shown used with a clear plastic retainer, it is also applicable for use with an opaque retainer made of any suitable material.

Although the auxiliary archwire is U-shaped, other shapes are contemplated, such as a scalloped, Z-shaped or other auxiliary archwire shapes.

The above-described embodiments are intended to be examples of the present invention and alterations and modifications may be effected thereto, by those of skill in the art, without departing from the scope of the invention, which is defined solely by the claims appended hereto.

What is claimed is:

1. An orthodontic lip advancer for use with an orthodontic upper anchoring appliance having a first hook for attaching an inter-arch traction elastic thereon, the traction elastic extending diagonally to attach to at least one lower posterior orthodontic bracket having a second hook, wherein the traction elastic imparts a distal-to-mesial force on the lower arch causing labial flaring of the lower arch anterior teeth, the orthodontic lip advancer comprising:

a liner-type plastic retainer sized and shaped for use with a lower dental arch; and a bumper comprising a plurality of portions each corresponding to an anterior tooth, an entire height of each portion in contact with the retainer in the gingival-occlusal direction, the bumper extending directly labially from and along the length of an anterior portion of the retainer extending along the labial surface of the lower arch anterior teeth when the orthodontic lip advancer is worn and having a thickness for pressing against the patient's lip thus stretching the lip labially causing the lip muscles to react pushing back with a lingual second force opposite the first force to cause the bumper to directly impinge the retainer upon the anterior teeth thus substantially preventing the anterior teeth from flaring labially wherein the bumper is positioned to localize forces exerted by muscles of the lip muscles.

2. The orthodontic lip advancer of claim 1, wherein the bumper comprises a plurality of at least four portions each corresponding to an anterior tooth portion of the retainer.

3. The orthodontic lip advancer of claim 1, wherein the bumper is integrally formed with a labial wall of the retainer.

4. The orthodontic lip advancer of claim 1, wherein the bumper is attachable to a labial wall of the retainer.

5. The orthodontic lip advancer of claim 2, wherein the plurality of portions comprise eight portions corresponding to four incisors, two canines, and two premolars on the lower arch.

6. The orthodontic lip advancer of claim 2, wherein the plurality of portions comprise six portions corresponding to four incisors and two canines on the lower arch.

7. The orthodontic lip advancer of claim 2, wherein the plurality of portions comprise four portions corresponding to four incisors on the lower arch.

8. The orthodontic lip advancer of claim 1, wherein the bumper extends: from a lower right first premolar to a lower left first premolar, from a lower right canine to a lower left canine, or from a lower right lateral incisor to a lower left lateral incisor.

9. The orthodontic lip advancer of claim 1, wherein the bumper is formed of thickened plastic material.

10. The orthodontic lip advancer of claim 1, wherein the bumper is hollow having a space between a more lingually positioned lining fitting over the lower anterior teeth and a labial lining in contact with the lip.

11. The orthodontic lip advancer of claim 1, wherein the bumper extends gingivally-occlusally for the full height of the anterior teeth.

12. The orthodontic lip advancer of claim 1, wherein the bumper has a height in the gingival-occlusal direction that is shorter than the full height of the anterior teeth.

13. The orthodontic lip advancer of claim 12, wherein the bumper is positioned close to an occlusal edge of the retainer such that the second force is applied to an incisal part of each of the anterior teeth for producing greater moment forces on the incisors.

14. The orthodontic lip advancer of claim 1, further comprising a plurality of cosmetic bonding resin sections bonded to the labial surface of the anterior teeth for providing additional thickness to the lip advancer for labially pressing against the patient's lip.

* * * * *